(12) United States Patent
Anderson et al.

(10) Patent No.: US 9,928,878 B2
(45) Date of Patent: Mar. 27, 2018

(54) TECHNIQUES AND APPARATUS FOR EDITING VIDEO

(71) Applicant: INTEL CORPORATION, Santa Clara, CA (US)

(72) Inventors: Glen J. Anderson, Beaverton, OR (US); Guiseppe Raffa, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 22 days.

(21) Appl. No.: 14/459,229

(22) Filed: Aug. 13, 2014

(65) Prior Publication Data

US 2016/0049173 A1 Feb. 18, 2016

(51) Int. Cl.
  *H04N 9/80* (2006.01)
  *G11B 27/10* (2006.01)
  *G11B 27/031* (2006.01)
  *G11B 27/28* (2006.01)

(52) U.S. Cl.
  CPC ............ *G11B 27/10* (2013.01); *G11B 27/031* (2013.01); *G11B 27/28* (2013.01)

(58) Field of Classification Search
  CPC ... G11B 27/105; G11B 27/329; G11B 27/034; H04N 5/85; H04N 9/8042
  USPC .......................................................... 386/241
  See application file for complete search history.

(56) References Cited

U.S. PATENT DOCUMENTS

| | | | |
|---|---|---|---|
| 6,424,789 B1 * | 7/2002 | Abdel-Mottaleb .. | G11B 27/034 348/700 |
| 2005/0033760 A1 | 2/2005 | Fuller et al. | |
| 2009/0209335 A1 | 5/2009 | Pearce | |
| 2011/0071792 A1 * | 3/2011 | Miner ................ | G06K 9/00771 702/182 |
| 2012/0263439 A1 | 10/2012 | Lassman et al. | |
| 2012/0308209 A1 | 12/2012 | Zaletel | |
| 2013/0125000 A1 | 5/2013 | Fleischhauer et al. | |
| 2015/0262617 A1 * | 9/2015 | Jaime ................... | G11B 27/034 386/241 |
| 2015/0318020 A1 * | 11/2015 | Pribula ................ | G11B 27/031 386/227 |

OTHER PUBLICATIONS

Korean Publication KR 779661 Mar. 2007.*
International Search Report and Written Opinion received for PCT Patent Application No. PCT/US2015/037618, dated Oct. 16, 2015, 11 pages.

* cited by examiner

*Primary Examiner* — William Tran

(57) ABSTRACT

An apparatus may include a memory to store a recorded video. The apparatus may further include an interface to receive at least one set of sensor information based on sensor data that is recorded concurrently with the recorded video and a video clip creation module to identify a sensor event from the at least one set of sensor information and to generate a video clip based upon the sensor event, the video clip comprising video content from the recorded video that is synchronized to the sensor event.

21 Claims, 12 Drawing Sheets

Automated Video Editing System
200

*Automated Video Editing System*
250

TECHNIQUES AND APPARATUS FOR EDITING VIDEO

TECHNICAL FIELD

The present embodiments are related to techniques for managing video content and to the creation and distribution of video clips.

BACKGROUND

Recording of video content is ubiquitous as the proliferation of devices equipped with video recording capability expands to encompass portable computers, netbooks, tablet computers, cell phones, smart phones, phablets, wearable devices such as watches, glasses, and mountable video recording device. Because of the increased density of recording media, and the ability to stream video efficiently between devices, even relatively small devices may be equipped to record large videos that may consume minutes of time or more.

However, such recorded videos may often remain unprocessed after recording due to the relatively cumbersome task of editing video content, which may be time consuming and may not be conveniently performed on many devices. Although professional editing may be performed to produce a more enjoyable video content based upon user-recorded video, the number of videos that are recorded by an amateur user and the expense associated with professional editing may preclude this choice except in very special circumstances.

As a result, in a large number of instances, non-edited amateur videos that are recorded in a wide variety of settings, such as sporting events, holidays, gatherings, meetings, and the like, may accumulate and may be rarely enjoyed after recording. It is with respect to these and other considerations that the present improvements may be needed.

DETAILED DESCRIPTION

Figure 1A:
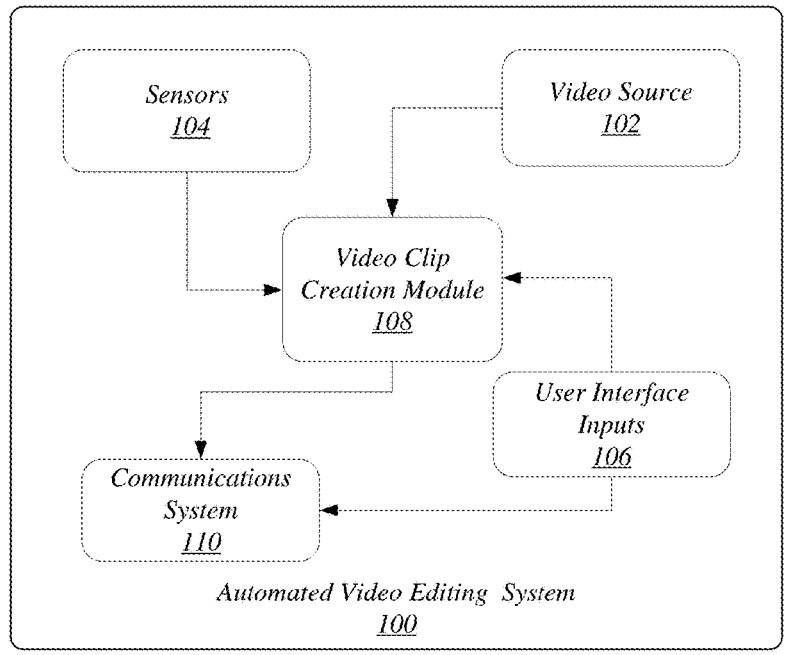
FIG. 1A illustrates a block diagram of an automated video editing system according to various embodiments.

Embodiments provide enhancements for editing of videos. Consistent with various embodiments, systems, techniques and apparatus are provided that enhance the editing of a video by employing sensor data that may be collected concurrently with the recording of the video. The sensor data may be used to identify a sensor event or sensor events that form the basis of generating a video clip or video clips.

Various embodiments exploit the capability of sensor technology that may be deployed across a wide variety of components, both wearable and non-wearable, in order to facilitate automated video editing. In particular various embodiments provide systems and methods to exploit sensor information that may be recorded, collected and synchronized with a concurrently recorded video to assist in editing that video. The term "video" as used herein may refer to a digital recording that contains a video track, and may optionally include or be associated with other recorded data, such as an audio track. Unless otherwise noted, the term "video" (also referred to as "recorded video") as used herein may also refer to recorded video that records live activity using a camera, sensor, or other detector, as opposed to a computer-generated video or animation. In the context of the present embodiments, a video may be recorded in any suitable setting by any suitable recording device including a camera, dedicated video camera, computer, portable computer, tablet computer, cell phone, smart phone, phablet, wearable camera, other wearable device such as a head mounted device, digital watch device, or other device. The embodiments are not limited in this context.

The present embodiments may provide a video clip creation module that uses sensor information collected concurrently with video in order to identify instances in a video from which to generate a video clip or video clips. The term "video clip" as used herein may refer to a portion of a recorded video that is less than the entire video, whose duration may be a fixed duration or may be variable. In some instances the duration of a video clip may be on the order of several seconds, or several tens of seconds. However, the embodiments are not limited in this context.

The present embodiments also provide systems and architecture that facilitate efficient computation to generate video clips. In some examples, sensor information may constitute unanalyzed sensor data that is collected concurrently with video from which video clips are to be created. The unanalyzed sensor data may be received by a device that records the video, such that the recording device may generate video clips from the recorded video, either in real-time, or subsequent to the recording of the video. In other examples, sensor information may constitute sensor data that is collected concurrently with a video and is received and analyzed by a remote device such as a server. The analyzed data may transmitted to or retrieved by a user device, such as a device that records the video, or other user device. The sensor information may include at least one set of sensor information where a set of sensor information includes one or more items of sensor information. For example multiple sets of sensor information may be collected from multiple sensors concurrently with the recording of a video. A given set of sensor information may be derived, for example, from a data stream composed of multiple items of data that is output over time from a given sensor.

In various embodiments, a video clip creation module may be embedded in any convenient device such as a user device that records a video. The video clip creation module may be used to identify a sensor event from a set of sensor information that is received by the user device and to generate a video clip based upon the sensor event.

In some embodiments, a sensor event that triggers the generation of a video clip may be identified in real-time during recording of video. In other embodiments, the sensor event may be identified after-the-fact based upon recorded video and sensor information. In still other embodiments, the occurrence of a sensor event may be used to guide recording of a video in real time. As used herein, the term "sensor event" refers to detected activity based upon sensor data other than video Examples of sensors that may be employed in accordance with the present embodiments include accelerometers, gyrometers, position detectors, altimeters, audio detectors, proximity sensors such as radio frequency or infrared proximity sensors, humidity sensors, or other sensors, that can detect characteristics of the environment, people nearby, the person recording and the devices. The embodiments are not limited in this context. Examples of sensor events include a rapid change in an accelerometer reading as a function of time, which may be indicative of a force experienced by a sensor. Other sensor events may include a rapid change in altitude detected by an altimeter as a function of time, a rapid change in audio intensity as a function of time, and so forth. In various embodiments, a sensor event may be composed of multiple changes that are detected by multiple different sensors at the same time or closely spaced in time, such as two events that occur within several seconds of one another. In addition, a sensor event may have other information associated with the sensor event, such as a time stamp and information concerning an object or entity that triggered the sensor event.

The sensor event may occur during the concurrent recording of video such that the sensor event may be temporally correlated or synchronized with the video. Synchronization may be facilitated, for example, with the aid of time stamps that are provided with recorded sensor data and recorded video. For example, sensor data may be recorded and stored with a time stamp for each item of recorded sensor data. The time stamp associated with a given sensor event may then be used to synchronize with video which may be recorded with its own time stamp, so that a portion of video that is recorded during a given sensor event may be identified. In various embodiments sensor data and video from the different components used to record video and sensor data may be synchronized according to known protocols such as network time protocol (NTP).

As detailed below, in accordance with various embodiments, a determination may be made as to whether and how to generate a video clip from a recorded video based upon a sensor event.

FIG. 1A illustrates a block diagram of an automated video editing system 100 according to various embodiments. The automated video editing system 100 provides a general architecture that may be implemented in different manners to automatically generate video clips from recorded video. As illustrated, a video clip creation module 108 may receive inputs from various components. A video source 102 may provide video to the video clip creation module either in real time or subsequent to recording of the video. The video source 102 may be a video recording device in some implementations, but may also be a device that stores video recorded by a separate device. Sensors 104 may include at least one sensor that is not a video recording device as noted above. The sensors 104 may provide sensor information to the video clip creation module 108 that is used to assist in automated video editing of a given video, such as the generation of at least one video clip from the video supplied by video source 102. User interface inputs 106 may also be provided to the video clip creation module 108 to assist in video editing as detailed below.

It is to be noted that the video clip creation module 108 and other similar components as disclosed below, may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The video clip creation module 108 may be coupled to a communications system 110. As detailed below an output of the video clip creation module 108 may be at least one video clip that is excerpted from a video provided by the video source 102. As detailed below a video clip generated by the video clip creation module 108 may be sent via the communications system 110 to various destinations. These destinations may include a user device that records video from which the video clip is created, a specific external device or devices, or may be a cloud storage destination, where cloud storage represents storage of user data that may span one or more locations and may be controlled by one or more computers that are hosted via a third party and are accessible to the user via a network such as the Internet. In some examples, a destination or destinations for receiving a video clip may be determined from user interface inputs 106.

Figure 1B:
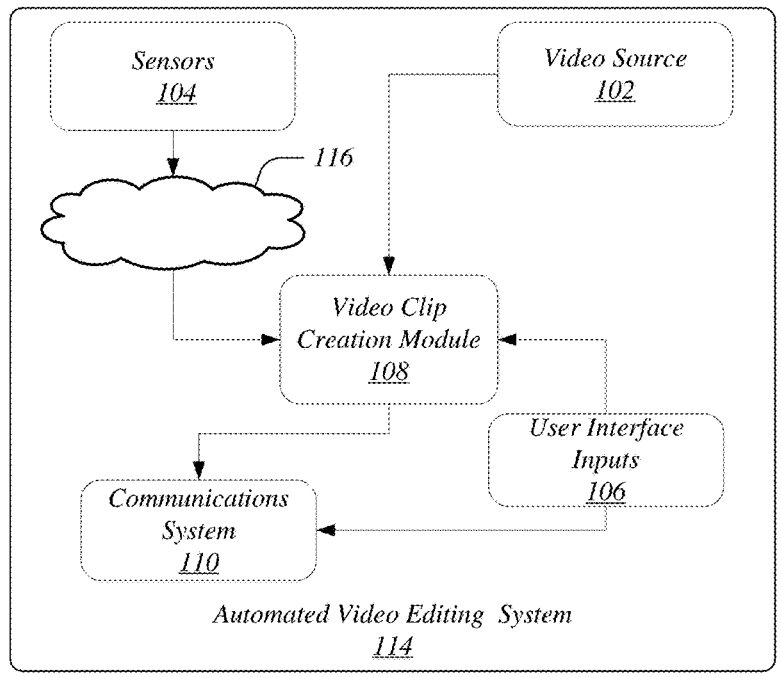
FIG. 1B depicts a block diagram of an automated video editing system according to various additional embodiments.

In some embodiments, a cloud/server infrastructure may be provided that is coupled to sensors whose sensor data is to be used to generate video clips from a video. FIG. 1B depicts a block diagram of an automated video editing system 114 according to various additional embodiments. The automated video editing system 114 provides a general architecture that may be implemented in different manners to automatically generate video clips from recorded video. As illustrated, automated video editing system 114 may include those components as described above with respect to FIG. 1A. However, the architecture of automated video editing system 114 also includes a cloud/server system 116, which may include various storage, communications, and data processing components that are arranged in a cloud architecture. As illustrated, the sensors 104 are linked to the cloud/server system 116. The sensors 104 may provide sensor information to the cloud/server system 116 that is used to assist the video clip creation module 108 in automated video editing of a given video, as described in more detail below. The cloud/server system 116 may output, for example, sensor information that includes analyzed sensor data to aid the video clip creation module 108 in identifying a sensor event that triggers creation of a video clip.

Figure 1C:
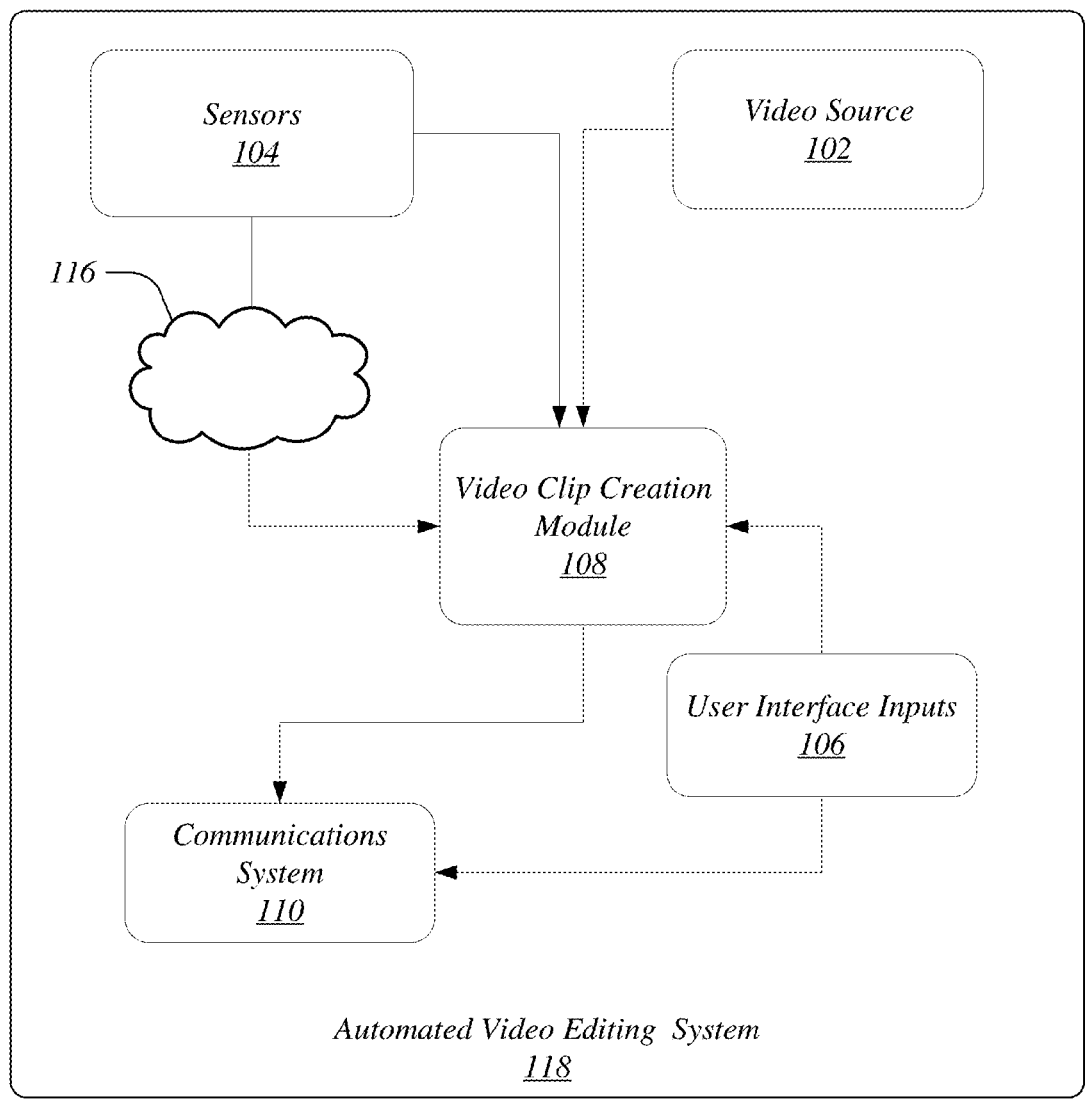
FIG. 1C depicts a block diagram of an automated video editing system according to various additional embodiments.

In the example of FIG. 1B a video clip creation module 108 is linked to the cloud/server system 116 to receive analyzed sensor information, for example, but not directly linked to sensors 104. However, in other examples, a video clip creation module 108 may be linked directly to both a cloud/server system 116 and to sensors 104. FIG. 1C depicts a block diagram of an automated video editing system 118 according to various additional embodiments. The automated video editing system 118 provides a general architecture that may be implemented in different manners to automatically generate video clips from recorded video. As illustrated, automated video editing system 118 may include those components as described above with respect to FIG. 1A and FIG. 1B. However, in the embodiment of FIG. 1C the video clip creation module 108 is linked both to the sensors 104 and the cloud/server system 116. In this implementation, the video clip creation module 108 may receive sensor data directly from sensors 104 and may also receive sensor information that includes analyzed sensor data from the cloud/server system 116.

Figure 1D:
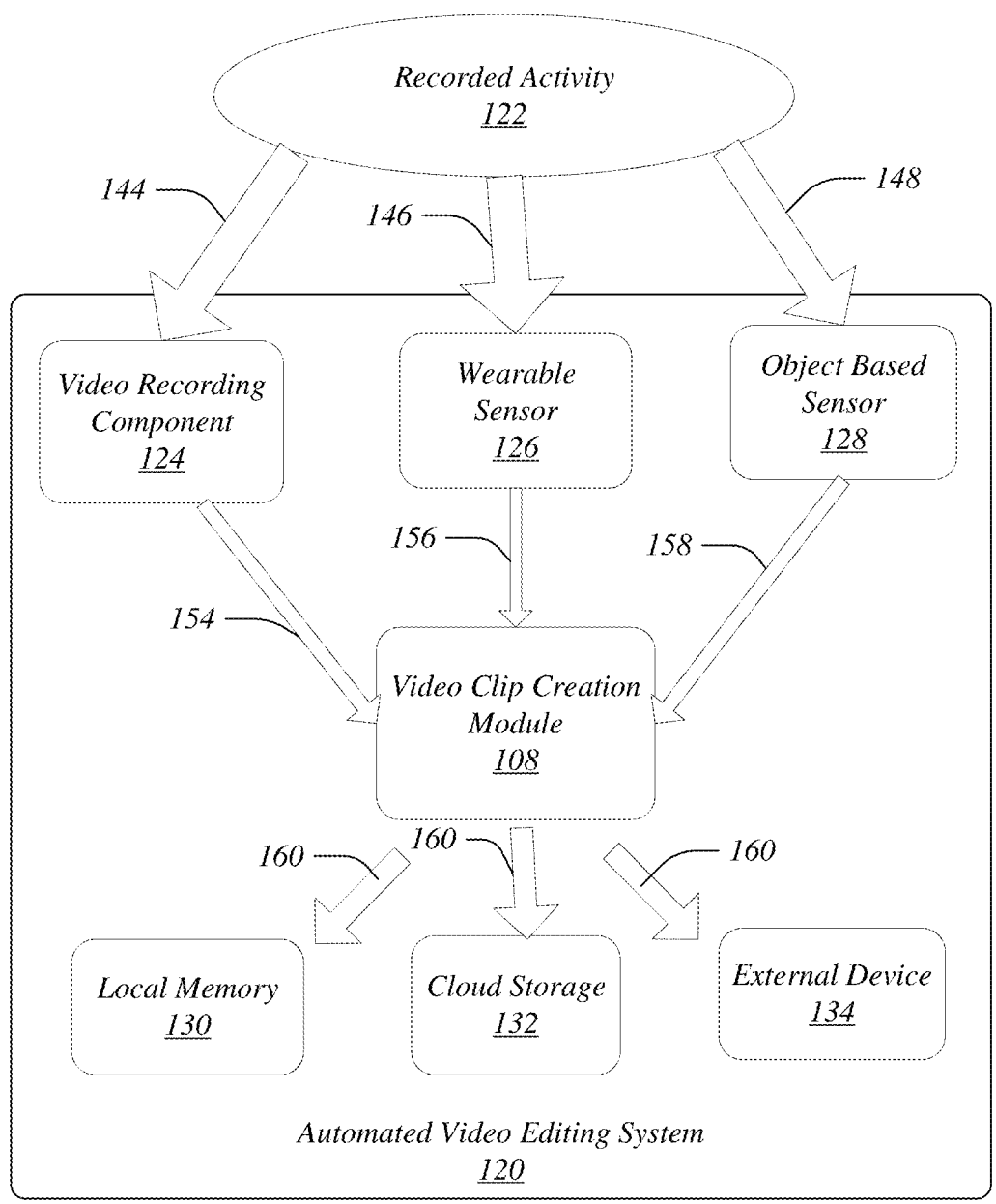
FIG. 1D depicts a block diagram of operation of another automated video editing system arranged in accordance with additional embodiments.

In some embodiments, sensors that provide inputs to a video clip creation module may be distributed across multiple wearable and non-wearable components. For example, in a given environment in which a video is recorded multiple wearable and non-wearable sensors may be linked to a device to receive sensor information to be exploited by the video clip creation module to create a video clip. FIG. 1D depicts a block diagram of operation of another automated video editing system 120 arranged in accordance with additional embodiments. As illustrated, recorded activity 122 may represent any activity that is recorded by a device such as a video recording component 124. The recorded activity 122 may be a sporting event, a musical event, leisure activity, or other activity. The video recording component 124 may record video content 144 from the recorded activity 122, which may be composed of a video track and audio track in some embodiments. A wearable sensor 126 may record wearable sensor data 146, which in one example may be altimeter data. An object sensor 128 may record object sensor data 148, which in one example may be accelerometer data. The video recording component 124 may output a video 154, which includes a video track and a video track time stamp, for example. A video track time stamp may include a time entry for every video frame of a video track in one example. The wearable sensor 126 may output a sensor data stream 156, which may include altitude data recorded by the wearable sensor 126 as a function of time, as well as a time stamp in which each altitude data entry is associated with a time entry of the time stamp. The object sensor 128 may output sensor data stream 158 which may include accelerometer data recorded by the object sensor 128 as a function of time, as well as a time stamp in which each accelerometer data entry is associated with a time entry of the time stamp.

In operation the video clip creation module 108 may receive the video 154, sensor data stream 156, and sensor data stream 158, and may generate video clip output 160, which is composed of at least one video clip. The video clip output 160 may in particular include a given video clip having a duration of, for example, one second, five seconds, six seconds, or other duration. The video clip generation module 108 may select the given video clip based upon a sensor event that is determined from the sensor data stream 156, sensor data stream 158, or both sensor data stream 156 and sensor data stream 158. Details of determination of a sensor event are provided in the discussion to follow.

After generating video clip output 160, the video clip creation module 108 may send the video clip output 160 to various destinations, such as a local memory 130 that is resident on a device that contains the video clip creation module 108, or to cloud storage 132, or to an external device 134. The determination of destinations to receive video clips is also described in more detail below. In various embodiments, video clip output 160 may be generated in real time as a video 154 is being recorded, while in other embodiments video 154 may be processed by a video clip creation module 108 at a time subsequent to when the video 154 is recorded.

Figure 2A:
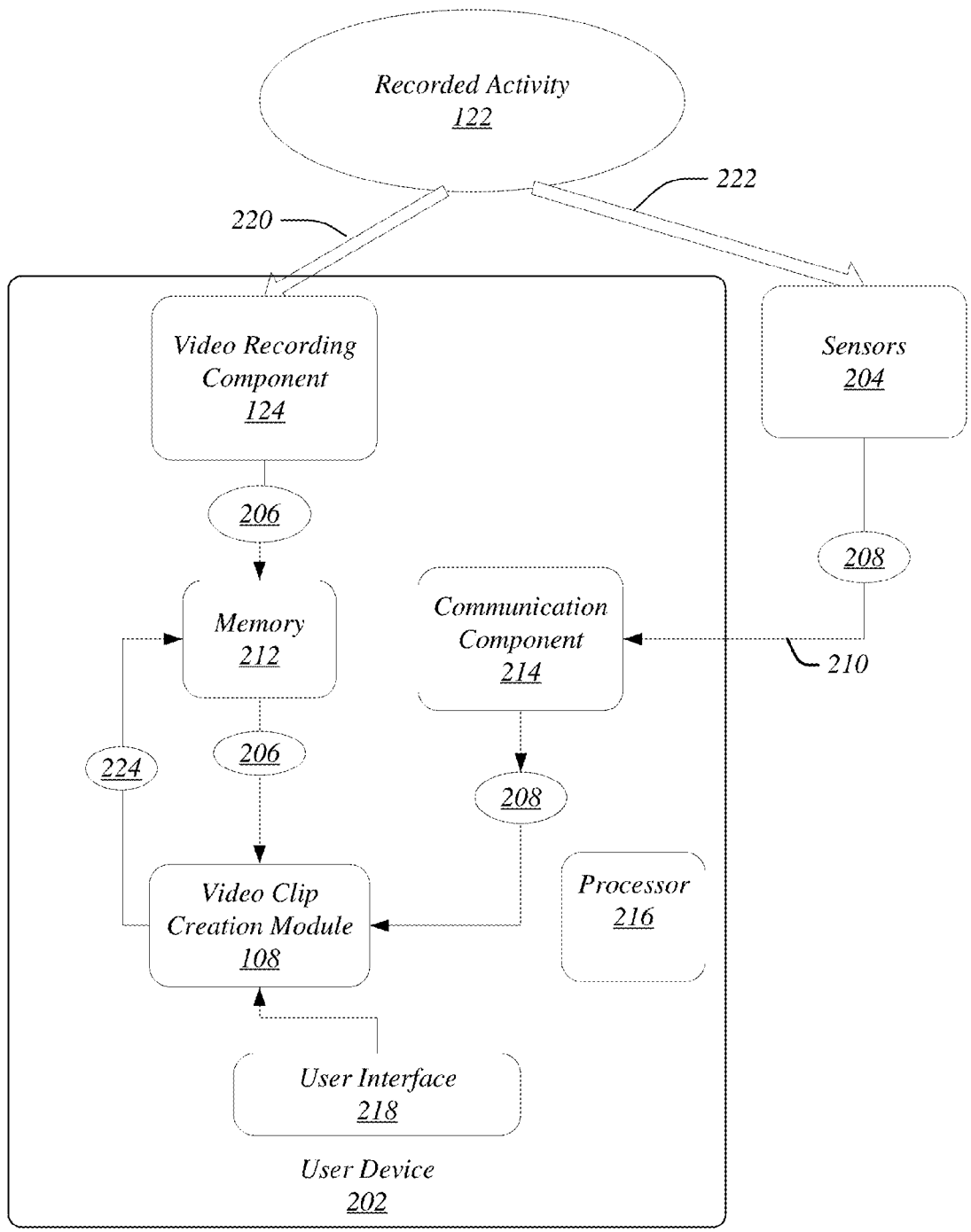
FIG. 2A depicts one additional embodiment of a video editing system.

In some embodiments a device that is used to record video may also generate video clips from the recorded video either in real-time or subsequent to recording of the video. FIG. 2A depicts one embodiment of a video editing system 200 that includes a user device 202, which is used as a video recording device. For example, the user device 202 may be a video camera, cell phone, smartphone, tablet computer, wearable device, phablet, or other device. In the example of FIG. 2A, the user device 202 includes a video recording component 124 that is used to record video content 220 from the recorded activity 122. Video 206 that includes the video content 220 and a time stamp may be stored locally, for example, in memory 212. Over a same period as user device 202 records video content 220, sensors 204 may record sensor data 222 from the recorded activity 122. The sensors 204 may output sensor information 208 that includes a time stamp for the sensor data 222. The user device 202 may include a communication component 214 that is operative to receive sensor information 208 over a link 210, which may employ a known wireless technology in some embodiments. The sensor information 208 and video 206 may be transmitted to the video clip creation module 108, which generates video clip output 224. As illustrated, the video clip output 224 may be stored in the memory 212. The video clip output 224 may also be distributed to other destinations, as illustrated, for example, in FIG. 1B.

In some embodiments separate logic or circuitry, such as processor 216, may be operative on the video clip generation module 108 to assist in generation of the video clip output 224, as well as the distribution of video clip output 224. As illustrated in the embodiment of FIG. 2A the processor 216 may operate locally within the user device 202. However, in other embodiments, a processor or other logic that assists in video clip generation, for example, may be located remotely from the user device 202, and may be located remotely from the video clip generation module 108. In such circumstances the processor may perform certain tasks that assist in determining a sensor event as detailed below.

As further shown in FIG. 2A the user device 202 includes a user interface 118, which may include a mouse, keyboard, keypad, voice input/output, touchpad, or touch screen, or other known component. The user interface 118 may transmit input to the video clip creation module to assist in generation of the video clip output 224, as well as the distribution of video clip output 224.

Figure 2B:
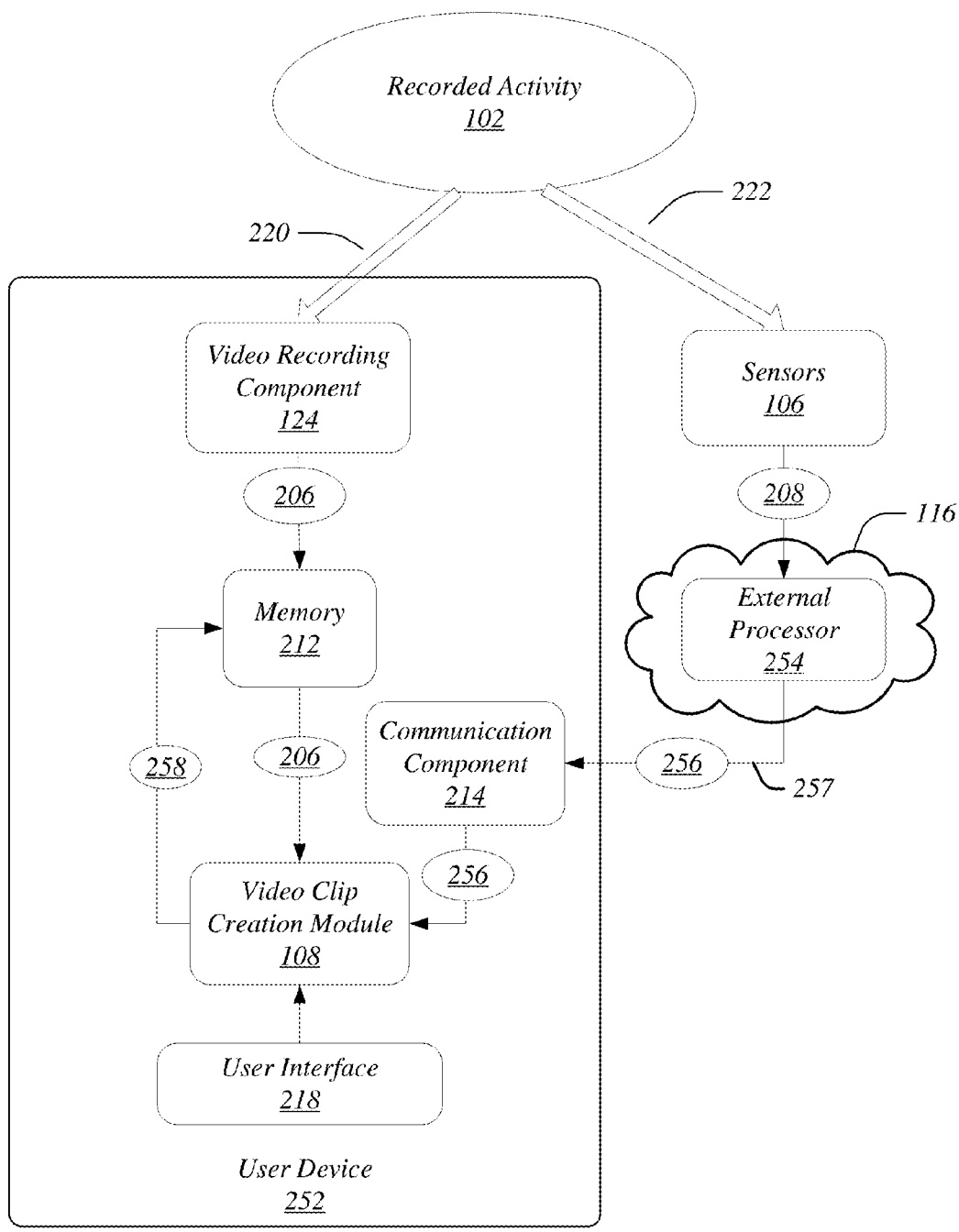
FIG. 2B depicts another embodiment of a video editing system.

FIG. 2B depicts another embodiment of a video editing system 250 that includes a user device 252 and may include similar components to those of user device 202. However, in the video editing system 250 the sensors 204 are coupled to an external processor 254 located in the cloud/server system 116 to send the sensor data 208, which is analyzed by the external processor 254. The external processor 254 may then forward sensor information 256 over a link 257 to the user device 202, in which the sensor information 256 represents a result of analysis of the sensor data 208. The sensor information 256 and sensor data 208 may be received by video clip creation module 108, which generates video clip output 258.

Figure 3:
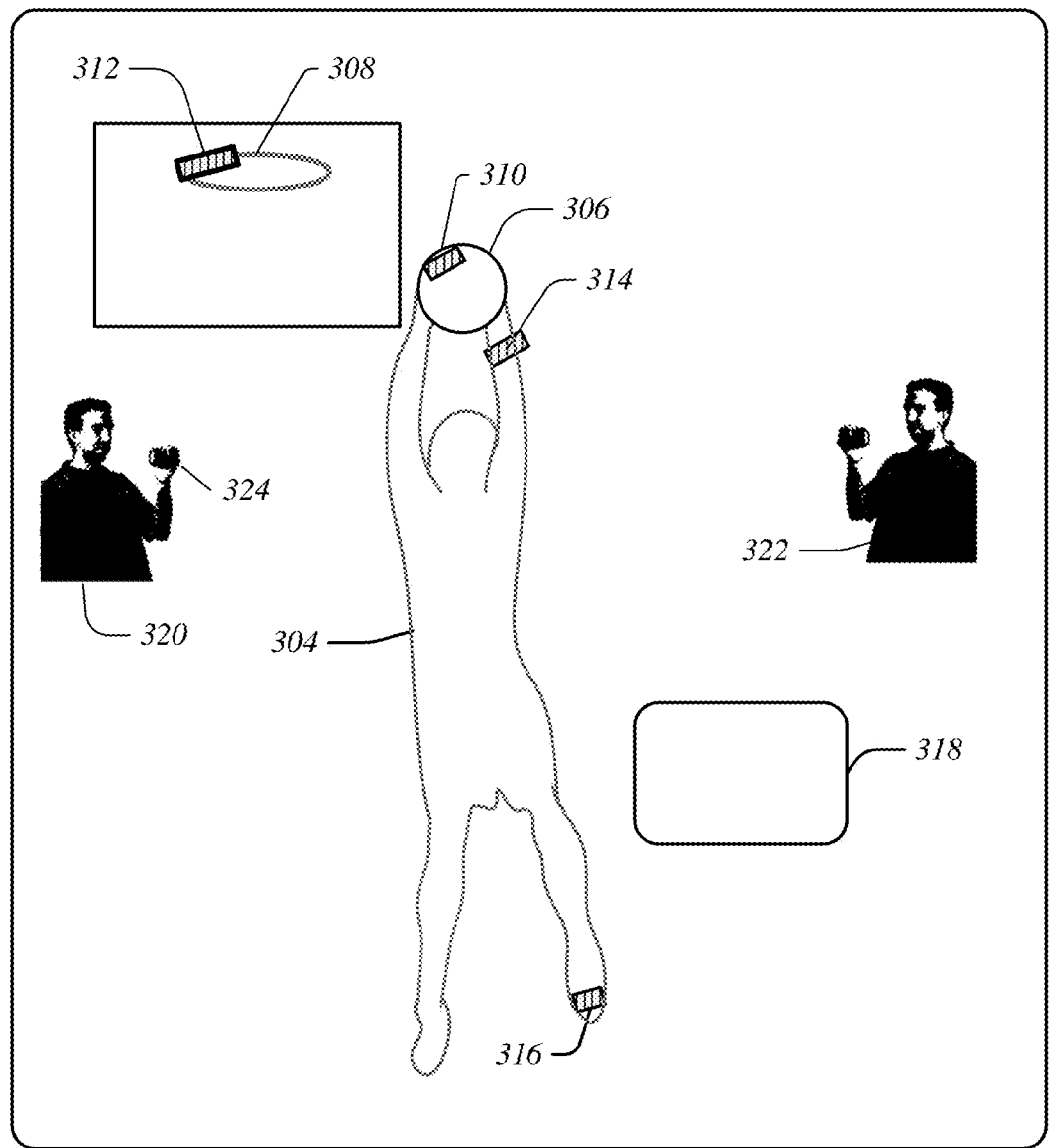
FIG. 3 illustrates an example of recorded activity.

For the purposes of illustration, in figures to follow there is illustrated one scenario for implementing automated video editing in accordance with embodiments of the disclosure. Turning now to FIG. 3, there is shown an example of recorded activity 302. In the particular example illustrated, the recorded activity 302 constitutes a basketball game. During the basketball game multiple users may employ devices to record video. In some cases, users may record minutes or even hours of video to document the basketball game. In order to assist users to generate short excerpts or video clips from that may present more interesting instances of action within a recorded video, an array of sensors may be deployed in the basketball arena. For example, wearable sensors may be worn by basketball players participating in the basketball game in order to record features such as movement, acceleration, orientation, location, or sound. In addition, fixed objects or movable objects may be equipped with sensors to record the aforementioned features or other features.

In the instance shown in FIG. 3, a player 304 grasps the basketball 306 and may be in the process of attempting to score at the basket 308. A ball sensor 310 is embedded in the basketball 306 and may record ball movement, acceleration, or location, for example. A hoop sensor 312 is affixed to the basket 308 and may record acceleration or force. A wrist sensor 314 is worn by player 304, which may detect motion, acceleration, orientation, or location. Similarly, a shoe sensor 316 is embedded in one or both shoes of the player 304, which may also detect motion, acceleration, orientation, or location. All of these sensors may be configured to collect sensor data and transmit that data, for example, by wireless transmitters that are collocated with the respective sensors. In one implementation, the sensor data recorded from the different sensors may be transmitted in real-time as the sensor data is recorded.

As further illustrated in FIG. 3, a user device 318 may record video from the basketball game. In one implementation, the user device 318 may also be configured to wirelessly receive sensor data generated by the wrist sensor 314, shoe sensor 316, hoop sensor 312, and ball sensor 310. In one particular example, the user of user device 318 may be a parent of the player 304 and may record a portion of the basketball game as a video. At the instance in time depicted in FIG. 3, the player 304 may complete a particularly nice layup that is recorded as a sensor event by the wrist sensor 314, shoe sensor 316, hoop sensor 312, and ball sensor 310. For example, at least one of the wrist sensor 314, shoe sensor 316, hoop sensor 312, or ball sensor 310 may register a large change in sensor data at the time the layup is completed. In one example, an accelerometer embedded in the shoe sensor 316 may record a spike, that is, an abrupt change, in acceleration that is indicative of a force during the layup. In one example, an accelerometer embedded in the shoe sensor 316 may record a spike, that is, an abrupt change, indicating an increased force experienced by the shoe sensor 316 during the layup. Similarly, an accelerometer embedded in the ball sensor 310 may also record an acceleration spike when the ball 306 hits the basket 308 or a backboard (not shown). In addition, a motion detector in the hoop sensor 312 may record a spike when the ball 306 strikes the basket 308.

Because each sensor may be configured to transmit sensor data with a time stamp, an instance in time associated with each sensor event recorded by a respective sensor may be provided to a device that is in communication with the sensors. Each of these individual sensor events may be recorded and time stamped so that an instance when the ball sensor 310, hoop sensor 312, wrist sensor 314 and shoe sensor 316 detect respective sensor events can be determined. In one implementation the user device 318 may be configured substantially the same as user device 202 to include a video clip creation module 108. The user device 318 may therefore receive respective time stamped sensor information from the ball sensor 310, hoop sensor 312, wrist sensor 314, and shoe sensor 316, and may analyze the received time stamped sensor information.

In addition, each sensor may have a unique identification that the location of each sensor or object or person associated with each sensor may be tracked, either by a sensor itself or by another entity such as a cloud based entity.

In one instance where the ball sensor 310, hoop sensor 312, wrist sensor 314, and shoe sensor 316 each generate sensor data spikes, such as acceleration spikes that are indicative of forces being experienced, the user device 318 may determine that multiple sensor events have occurred, and may determine that the multiple sensor events are closely spaced in time. The user device 318 may therefore determine that a video clip is to be created from video that is concurrently recorded by the user device 318, where the video clip is generated from a portion of the recorded video whose time stamp is closely synchronized with the received sensor events. For example, if the sensor events occur within a given two second time span at 2:15 in the second quarter of the basketball game, the user device 318 may generate a six second video clip that begins at 2:12 of the second quarter and ends at 2:18 of the second quarter in order to capture video that coincides with the determined sensor events. In this manner the user device 318 may automatically generate a video clip that encompasses the time frame in which the layup by player 304 takes place.

In other embodiments a video clip may be generated based on any predetermined relation to a time stamp of a sensor event. For example the video clip may be configured to start at a time corresponding to the time stamp of the sensor event or to overlap the time stamp so that the sensor event time stamp is in the middle of the video clip.

In one particular embodiment, the user device 318 may be configured to automatically send video clips that are created to designated target(s). Moreover, the user device 318 may further be configured to determine when to generate a video clip based upon a predetermined criteria such as stored information in the user device 318 or based upon user input received by the user device 318.

In one example, each wearable sensor that is deployed on a basketball player may have a unique identifier that is transmitted together with sensor data to identify the sensor and thus may identify the player 304 to a receiving device. Accordingly, the user device 318 may be configured to generate a video clip when a sensor event associated with the wrist sensor 314 of shoe sensor 316 is received. For example, a parent of the player 304 who operates the user device 318 may configure the user device 318 to generate a video clip and forward to other devices such as to a device of a parent that is absent from the basketball game.

It is to be noted that in the scenario of FIG. 3 multiple users may operate multiple different video recording devices to record the same basketball game, such as recording device 320 and recording device 322. The recording device 320 and recording device 322 may further be configured to receive sensor information transmitted from sensors deployed in the basketball arena depicted in the scene of recorded activity 322. However, the recording device 320, may be configured differently than user device 318, such that when the recording device 320 receives the same set of sensor events as received by the user device 318, the recording device 320 may or may not generate a video clip. For example, the operator of recording device 320 may be the parent of a different player (not shown) than player 304, and may configure the operating device 320 to generate a video clip when sensor events associated with wearable sensors worn by the different player are received, but not when sensor events associated with wrist sensor 314 or shoe sensor 316 are received. Accordingly, at 2:15 in the second period when the action depicted in FIG. 3 takes place, a video clip creation module 324 resident on the operating device 320 may determine that no video clip is to be generated based upon the sensor events detected at 2:15 in the second period or thereabouts.

It is to be noted that in the scenario of FIG. 3 that the video recording apparatus may be installed within the venue generally depicted in the recorded activity 302. In this manner, video and sensor data may be stored in a server that subsequently creates and distributes video clips to interested parties. For example, the fans of one player may request just the video clips that depict when that player scored.

Figure 4:
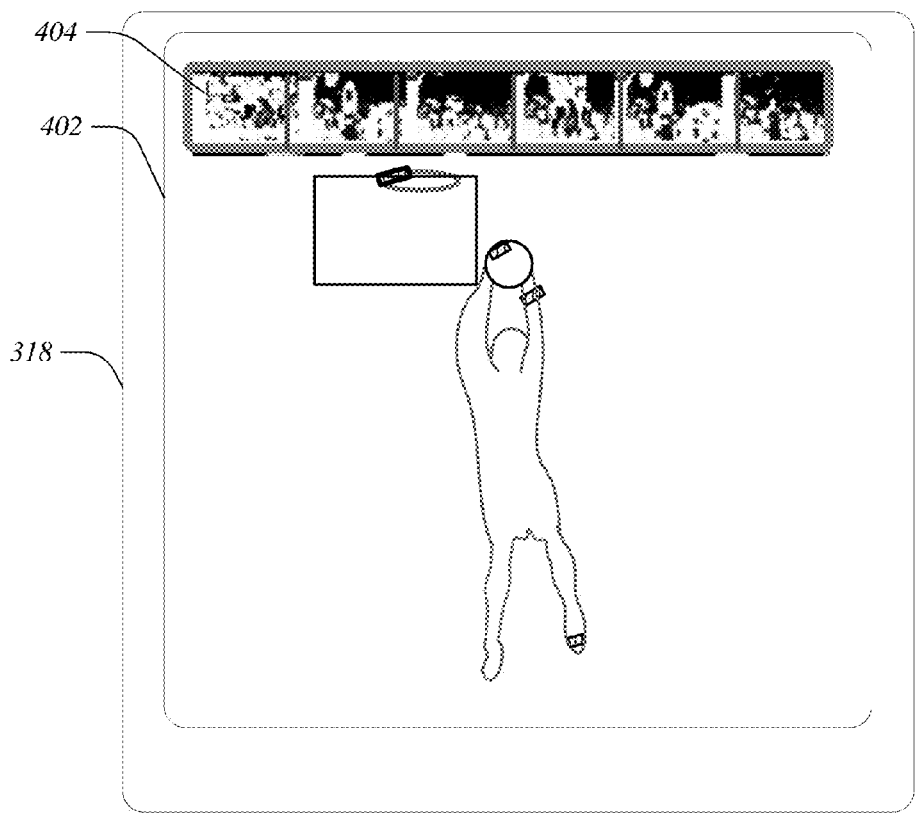
FIG. 4 depicts one variant of a user device.

In additional embodiments a user interface located on a user device may be configured to present indicators of a sensor event. FIG. 4 depicts one variant of the user device 318 in which the user device 318 is a smartphone that includes a display 402. Within the display 402 there may be presented the images of video being recorded as well as a video clip region 404 that presents a snapshot composed of a video frame that represents an instance in time for which a video clip has been created. The video clip region 404 may be updated in real-time as additional video clips are created.

Although the aforementioned scenario involves the generation of a video clips based upon sensors associated with a single player, in other embodiments, any number or sensors may be monitored that are deployed on any number of players or objects in order to automatically edit video. The automated generation of video clips may be based upon any number of sensor events as well as heuristics which may be associated with a particular activity such as a basketball game. In various embodiments a video clip generation module may be configured to generate a video clip based upon whether certain correlation criteria are met between different sensor events. For example, correlation criteria may include temporal correlation of sensor events, spatial correlation of sensor events, or both, among other possible correlations. The temporal correlation of sensor events may refer to the time interval between sensor events. The spatial correlation of sensor events may refer to spatial proximity between sensors that generate different sensor events. For example, in a basketball game in which multiple players are outfitted with wearable sensors, a video clip generation module may attribute an action to a particular player based upon the timing of different sensor events that are received from different players, and objects, such as a basketball.

Figure 5:
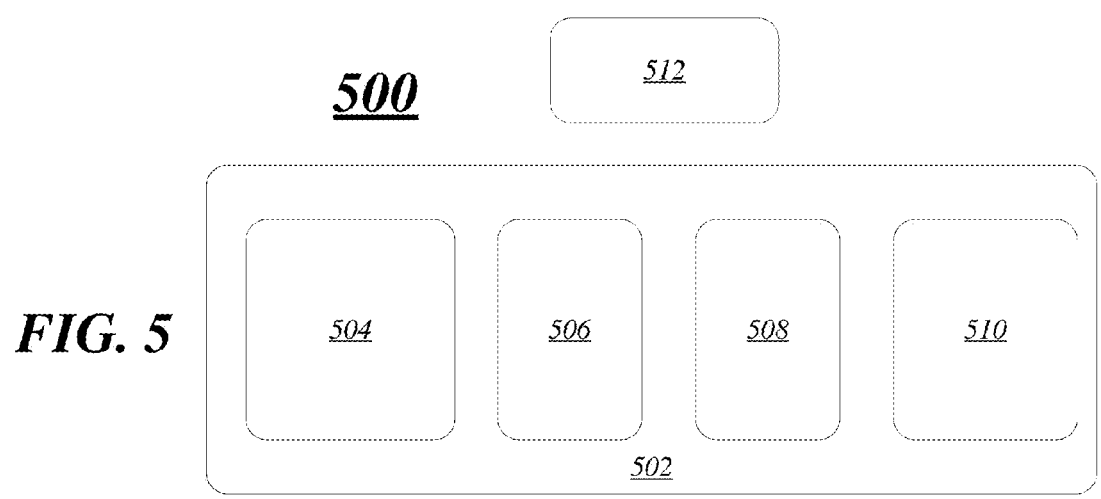
FIG. 5 depicts a block diagram of an automated video editing system according to additional embodiments.

FIG. 5 depicts a block diagram of an automated video editing system 500 according to additional embodiments. In this example, an architecture is shown that involves multiple different players having wearable sensors whose sensor information may be monitored to assist in video clip creation. A user environment 502 includes object sensors 504, which may include sensors embedded in or attached to movable objects or fixed objects. In the example of a basketball game the object sensors may include sensors embedded in a basketball and in basket. The user environment 504 further includes first player wearable sensors 506 and second player wearable sensors 508, each of which may be attached to respective first and second players. The user environment 502 may also include environmental sensors 510. All of these sensors may provide sensor data to the video clip creation module 512, which may be embedded in a video recording device in one example that records video in the user environment 502.

Figure 6:
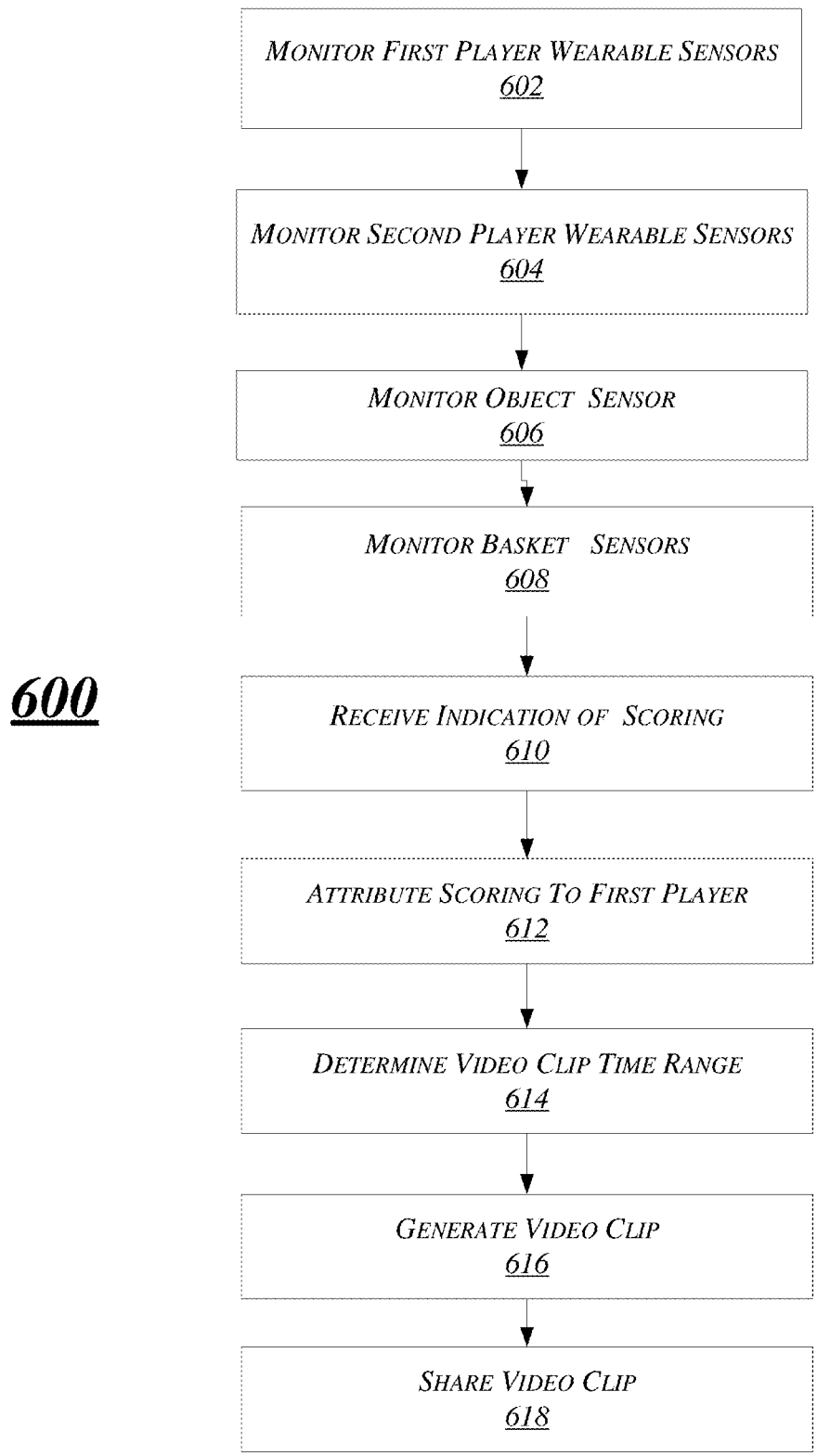
FIG. 6 depicts a sequence of operations involved for video clip generation when sensor events are detected based upon the architecture shown in FIG. 5.

FIG. 6 depicts a sequence of operations involved in which a video clip is generated when sensor events from multiple different players are detected based upon the architecture shown in FIG. 5. At operation 602, wearable sensors on a first player are monitored. The sensors may generate sensor data that indicates force or acceleration associated with the first player as a function of time. At operation 604, wearable sensors of a second player are monitored. At operation 606 object sensors are monitored, such as a basketball sensor. The basketball sensor may generate sensor data that indicates forces experienced by the basketball as a function of time. At operation 608 a basket sensor is monitored. The basket sensor may be sensitive to events such as when a basketball or player contacts the rim of the basket, which may generate forces that are registered by the basket sensor.

At operation 610 an indication of scoring is received. For example, the basketball sensor, the basket sensor, or both sensors may generate sensor data that indicates a force associated with an instance when a basketball interacts with the basket or backboard.

At operation 612 the detected scoring is attributed to the first player. For example, the scoring may be attributed to the first user based upon the timing of forces that are measured from the different sensor events registered from wearable sensors on the first player and on the second player, as well as forces registered by the basketball and basket.

At operation 614 a video clip time range is determined, which may be based upon the time stamp of the detected scoring and the attribution of scoring to the first user. The video clip time range may further be determined based upon user preferences that may be entered in a user device associated with a video clip generation module.

At operation 616 a video clip is generated which is excerpted from a video being recorded within the video clip time range. At operation 618, the video clip generated in operation 616 is shared with other destinations.

In summary the present embodiments provide multiple advantages in comparison to current technology where convenient tools for editing video are lacking. By providing automated identification and generation of video clips including the generation of video clips in real-time during recording of a video many additional scenarios and capabilities are enabled. For one, video content may be automatically edited based on sensed events and heuristics where the ability to determine when to generate a video clip can be improved over time by a video clip generation module.

In addition, various embodiments facilitate attribution of a sensor event to a user (player) based upon multiple sensors. In one example, wearable force sensors may be analyzed in concert with sensor-embedded tools and objects that are not assigned to a single user, such as embedded sensors in a ball. A combination of sensor events detected from a ball sensor and wearable sensors on a user may then be employed to determine when that user contacted the ball.

In particular scenarios, an action on an object such as a ball may be attributed to a first player as opposed to a second player based upon the timing of spikes in forces (sensor events) experienced by the object and by wearable sensors on the first player and second player, as outlined above with respect to FIG. 6.

In addition, the present embodiments facilitate automatic communication of video clips to target destinations, which may include a variety of other people and systems in addition to a user device that generates the video clip. In some embodiments, social networking or email applications may be employed according to user preferences in a user device to set destinations for distributing a video clip. Destinations may include objects such as wearable displays, scoreboards or other devices that may be useful for presenting the video clips. In other embodiments, automatically generated video clips may also be automatically sent to a host in a social network previously chosen by a sensor wearer and/or by a person or system that records the video from which the video clips are created. For example, video clip creation module may be coupled to a memory or program that stores user inputs and directs video clips to a set of one or more destinations including a social media site. In this context automatic posting of a video clip may be directed to a hosted social media site that is publically accessible according to known methods so that those viewers with access to the social media site may instantly view a video clip after creation. In one example, the social media site may be hosted by a server or group of servers that are accessible via a data network, such as the Internet.

In one implementation, an automated video editing system may designate multiple persons may of interest for a particular video clip, such that multiple persons may freely engage in a social network to define interest in an object or person that is also tracked by a person filming an event.

In other implementations, an automated video editing system may be used to automatically generate video clips for presentation in conjunction with instant replay in broadcast sporting events. Based upon individual sensors associated with a given player, video clip generation may be targeted for that given player.

In additional implementations, contextual analysis may be performed, for example, to automatically determine when to generate video clips and to automatically determine destinations for a generated video clip. In various embodiments a video clip generation module may determine a source of sensor information that results in a sensor event that triggers creation of a video clip, and may schedule transmission of the video clip to a target destination at a remote location based upon the source of the sensor information. For example, it may be determined that a given sensor wearer is the source of a sensor event. One parent of a sensor wearer may be present at a game, who may be a user associated with a user device that records the video and generates the video clip. A user device or a server/cloud system may also determine using known technology that a second user device associated with a second parent of the sensor wearer is not present at the game. Accordingly, when a video clip is generated based upon action(s) of the sensor wearer, the video clip may be automatically forwarded to a target destination such as the second user device associated with the absent parent.

Another example of contextual analysis is the use of factors such as the time of day or type of activity being recorded as to whether to activate video clip generation. For example, in an automated video editing system that is deployed to record public events, such as a sports arena, video clip generation may be triggered according to the time of day, which may correspond to the time for a particular event, or could be triggered based upon the type of activity being recorded, such as a basketball game as opposed to running activity.

Moreover, the present embodiments may exploit a wide range of different type of sensor events to automatically generate video clips beyond those highlighted above. In some implementations, in addition to detection of physical activity such as jumping, the proximity of persons to other persons or proximity to objects may be registered as sensor events and used to automatically create a video clip. In additional embodiments, biosensors may be monitored to measure, for example, excitement level in a wearer of the biosensor in order to assess the involvement of the wearer in a particular action. If at a given instances the excitement level exceeds a certain threshold, a video clip excerpted from video synchronized to that instance may be generated.

Moreover, in some implementations, sensor activity or detected sensor events based upon sensor location, proximity, or force, as well as previous history of sensor data, may be used to proactively predict an activity to be captured in a video. For example, a video clip generation module or related logic may identify a sensor event based upon sensor data received from proximity sensors and accelerometers, and may determine that a certain sequence of events is underway. The video clip generation module may subsequently generate a signal to "recommend" to a user of a video recording device to move the recording device to capture in video a predicted activity. For example, the video clip generation module may generate a signal to move a video recording device to the right based upon a predicted kick or throw that is to take place in a scene being recorded by the video recording device, or may direct a video recording device to orient toward a region where greater action is taking place based upon sensor events recorded from multiple different sensors, such as players in a playing field or court. In some particular examples, haptic feedback may be provided to a user of a recording device to proactively direct actions to be performed by the recording device.

The automated video editing systems provided by the present embodiments also provide in real-time information that is needed to determine the "interestingness" of a particular video clip.

In particular examples, an automated video editing system may employ user preferences and heuristics to set the "interestingness" of a video clip or set of video clips to be stored, presented, or distributed to a destination. The user preferences or user criteria may also be used to set a duration of a video clip as well as to synchronize the video clip with a detected sensor event. An example of a user criterion includes: provide a video clip for five seconds before a certain individual scores a basket and three seconds after the basket is scored. In this example, a video clip generation module may set a predetermined relation between a time stamp of a detected sensor event that is identified as a basket and a video clip to be generated from a video recorded concurrently with the detected sensor event. Thus, when the video is synchronized to a data stream representing a detected sensor event, a video clip may be generated that spans a duration between five seconds before an instance in time of the video that corresponds to the instance of the sensor event and three seconds after the instance in time.

In other examples, a user may set a specific user criterion or criteria to decide whether to retain a generated video clip or whether to generate a video clip based on a sensor event. The user criterion may be, for example, to just retain a video clip based on when an individual interacts with certain objects, or when a sensor event corresponds to when a sensor wearer is jumping, or running fast, or the excitement/stress level is high.

The receipt of user preferences or user criteria to manage video clips may take place over any convenient user interface, which may be a voice activated interface or touch sensitive interface in some embodiments. For example, in reference to video clips of a given basketball player, a user may say, "Give me a highlight clip of Dawn that shows her five highest jumps," or "Make a one-minute highlight clip of Dawn's scores." If in one scenario Dawn scored 6 times, the automated video editing system may use an average of 10 seconds per score to generate a video clip highlight. Some of the video clips may be arranged to be longer than others, e.g., if Dawn had possession of the basketball for an extended period before scoring.

It is to be noted that various embodiments as discussed above allow the computation involved in automated video editing to be split between different entities, such as between a server/cloud system and a mobile device that houses a video clip creation module. This provides a further advantages that computation performed by a user device to generate a given video clip or video clips may be reduced, while still preserving the ability of a user device to tailor video clip generation to user preferences. For example, in a scenario of a given sporting event in which multiple recording devices are employed to record video, at least some of the recording devices may be equipped with video clip creation modules to automatically create video clips based upon video being recorded at the sporting event. During the sporting event multiple different recording devices may capture a record of the same action, albeit from slightly different points of view. However, action that is interesting for a user of a first device, whose relative is involved in scoring a basket or other actions, may not be of interest to other spectators who are recording the sporting event for other reasons. In addition, recorded material from a first user may be of interest to a second user so that sharing of content from the first user may aid the second user in obtaining desired video clips. Accordingly, an architecture such as presented in the automated video editing system 114 or the automated video editing system 118 may be employed to split computation involved in generation of video clips between a server/cloud system and a user device that houses a video clip creation module.

In one implementation, a server/cloud system may centralize common capabilities that are useful for generation of video clips. For example, the server/cloud system may be employed to receive sensor data from at least one sensor that is deployed at a recorded activity, and may perform calculations to make initial inferences, such as what person is performing a given action, what objects are involved, and so forth. These initial inferences may be forwarded to receiving user devices as analyzed data. The analyzed data may then be used by individual user devices to determine whether and how to create a video clip based upon user-specific inference and algorithms that are employed by the video clip creation module on the user device.

Thus, multiple different user devices at a sporting event may record a video that captures a first player scoring a basket. This action may be analyzed by a server/cloud infrastructure as a possible sensor event from which to generate a video clip, such that the analyzed data is transmitted to user devices coupled to the server/cloud system. The analyzed data may include indicia that indicate identity of the first player involved in scoring the basket in one example. A user device of the relative of the first player may be configured to automatically generate a video clip based upon a detected sensor event associated with the first player, while other user devices may be configured create a video clip based upon a detected event when other criteria are met. Accordingly, the same instance of scoring by the first player may trigger automatic creation of a video in some user devices but not others, all of which user devices may be recording the same or similar video. At the same time the amount of computation performed locally on a user device may be reduced since the user device is not required to make an initial determination, for example, as to the occurrence of a sensor event or as to the identity of a person associated with the sensor event.

In various additional embodiments, the partitioning of computation involved in automated generation of video clips between a local user device and a server/cloud system may be varied. In one example complete computation for automated generating of video clips may be performed in a cloud/server system, while in another example, complete computation for automated generating of video clips may be performed in a user device.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
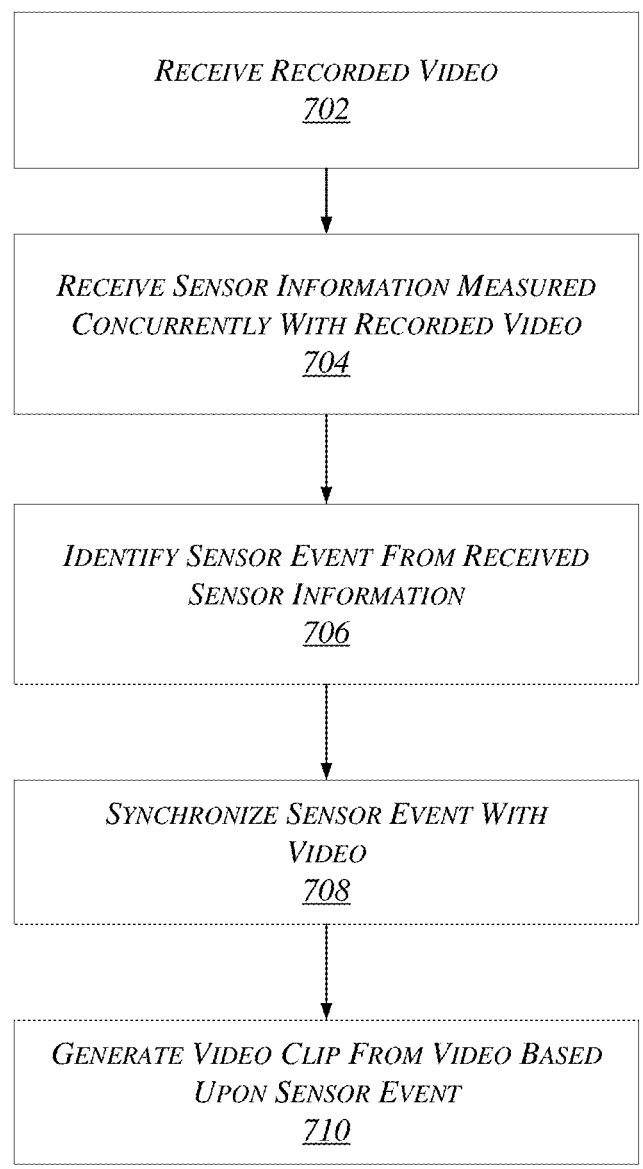
FIG. 7 shows an exemplary first logic flow.

FIG. 7 illustrates an exemplary first logic flow 700. In some examples, the logic flow 700 may be implemented in a user device that is configured to record a video. At block 702 recorded video is received. The recorded video may be received in real-time such that a first portion of the recorded video is received while a second portion is being recorded or is yet to be recorded.

At block 704, sensor information is received that is based on sensor data measured concurrently with the recording of the recorded video. In one example the sensor information may be a sensor data stream that is received from a sensor in real time as the sensor data is being measured.

At block 706 a sensor event is identified from the received sensor information. The identification of a sensor event may be based upon any suitable criterion related to the sensor information such as a change in a value of sensor data as a function of time. The sensor event may be time stamped such that a sensor event time stamp indicating the time at which the sensor event occurs is provided in the sensor information.

At block 708, the sensor event is synchronized with the recorded video. For example the recorded video may include a video track time stamp that is used to synchronize the video to the sensor event by identifying an instance in the video that corresponds to the sensor event time stamp.

At block 710 a video clip is generated based upon the sensor event. The video clip may be created from a portion of the recorded video that overlaps the sensor event time stamp, for example.

Figure 8:
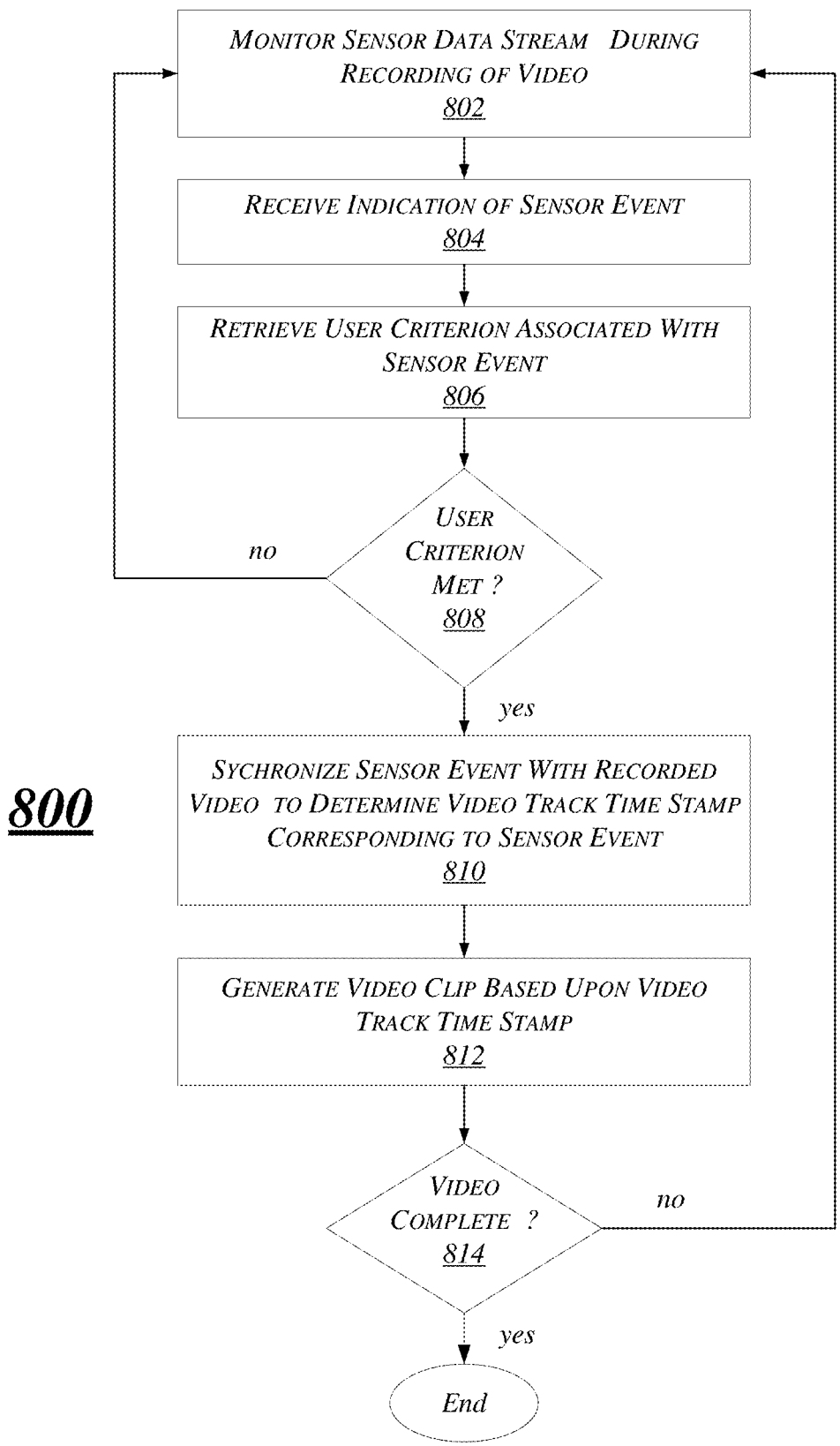
FIG. 8 shows an exemplary second logic flow.

FIG. 8 illustrates an exemplary second logic flow 800. In some examples, the logic flow 800 may be implemented in a user device that is configured to record a video. At block 802 a sensor data stream is monitored during recording of a recorded video. The sensor data stream being monitored may be produced by a sensor such as a wearable sensor or object sensor or environmental sensor, to list a few examples.

At block 804 an indication of a sensor event is received based upon the monitored sensor data stream. The indication of a sensor event may be received from an external device such as a cloud server, or may be generated by a user device that records the video.

At block 806 a user criterion is retrieved that is associated with the sensor event. For example, the sensor event may be determined from a data stream produced by a wearable sensor worn by a known person. A user criterion may set a threshold for a sensor event based on the actions of the known person, such as the speed of movement, or level of excitement as determined in the sensor event.

At decision block 808 a determination is made as to whether the user criterion is met. If not the flow returns to block 802. If so, the flow proceeds to block 810. At block 810 the sensor event is synchronized with the recorded video to determine a video track time stamp corresponding to the sensor event. The flow then proceeds to block 812 in which a video clip is generated based upon the video track time stamp. The flow subsequently moves to decision block 814.

At block 814 a determination is made as to whether the video is complete, such as whether recording has stopped. If not the flow returns to block 802. If so the flow ends.

Figure 9:
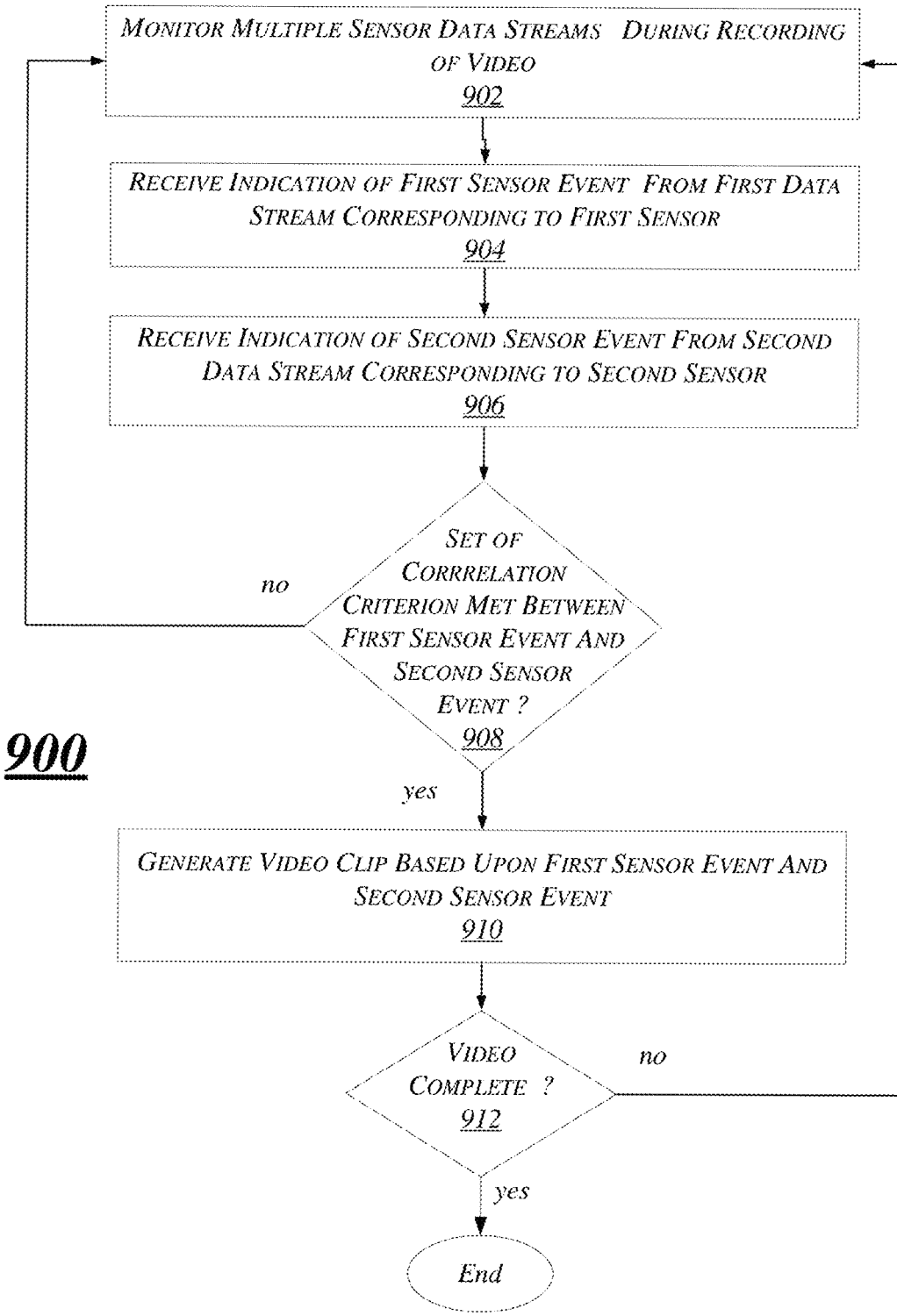
FIG. 9 shows an exemplary third logic flow.

FIG. 9 illustrates an exemplary third logic flow 900. At block 902, multiple sensor data streams are monitored during recording of a video.

At block 904, an indication of a first sensor event is received that corresponds to a first sensor. At block 906 an indication of a second sensor event is received that corresponds to a second sensor different from the first sensor. The first and second sensor may be located within a field of view that is recorded in the video at least during portions of the recording of the video. The flow then proceeds to decision block 908.

At decision block 908 a determination is made as to whether a set of correlation criterion is met. The set of correlation criterion may include at least one correlation criterion such as a criterion related to temporal correlation between the first sensor event and second sensor event. One particular example of a correlation criterion may be a threshold of elapsed time between the first sensor event and second sensor event. If the elapsed time between first sensor event and second sensor event fall below a threshold, the correlation criterion may be deemed to be met. Additionally a correlation criterion may be composed of a computed correlation coefficient between data sets, or numbers derived from the data sets, from two or more sensors. A chosen level for correlation coefficient value may be chosen to be the threshold. In various additional embodiments, various mathematical treatments may be used to form the basis of a correlation criterion, such as partial correlations, semi-partial correlations, and multiple regression analysis. In some instances, data from one or more sensors may be used as a covariate as part of the analysis.

If not, the flow returns to block 902. If so, the flow proceeds to block 910. At block 910 a video clip is generated based upon the first sensor event and second sensor event. The video clip may be synchronized to overlap in time the first sensor event and second sensor event in one example.

The flow then proceeds to decision block 912 where a determination is made as to whether the recording of the video is complete. If not, the flow returns to block 902. If so, the flow ends.

Figure 10:
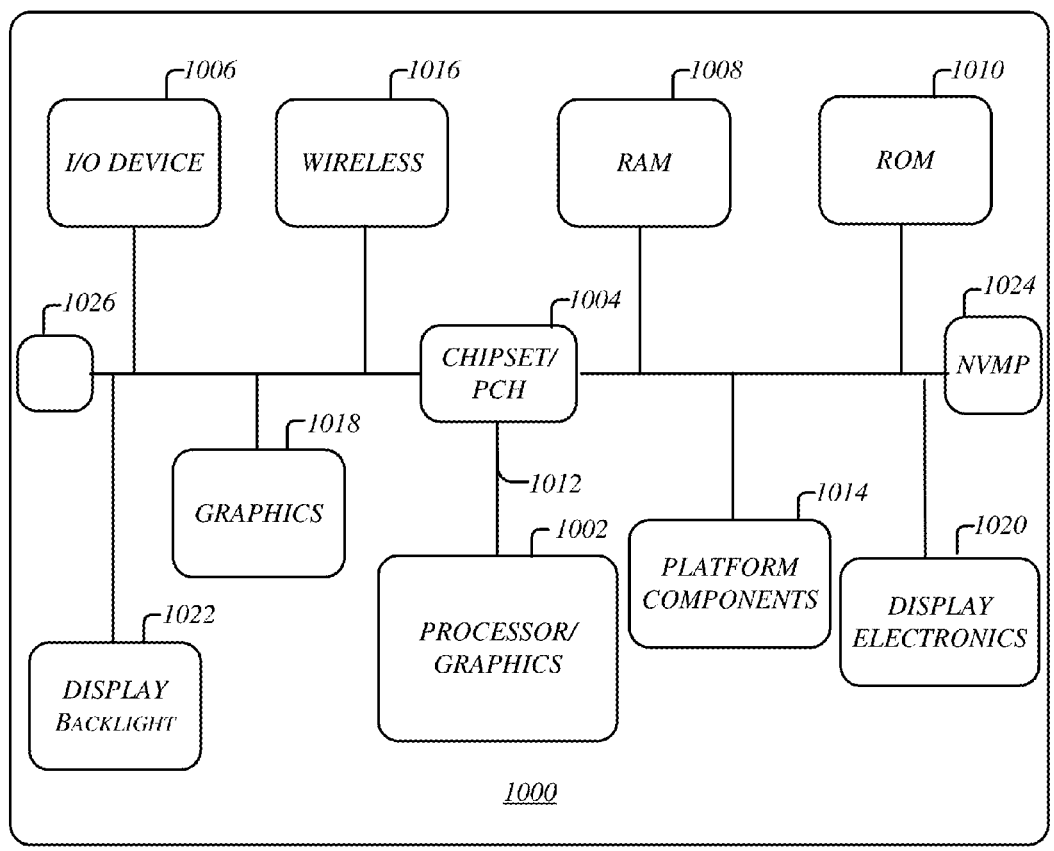
FIG. 10 illustrates an exemplary system architecture.

FIG. 10 is a diagram of an exemplary system embodiment and in particular, FIG. 10 is a diagram showing a system 1000, which may include various elements. For instance, FIG. 10 shows that system (platform) 1000 may include a processor/graphics core, termed herein processor 1002, a chipset/platform control hub (PCH), termed herein chipset 1004, an input/output (I/O) device 1006, a random access memory (RAM) (such as dynamic RAM (DRAM)) 1008, and a read only memory (ROM) 1010, display electronics 1020, display backlight 1022, and various other platform components 1014 (e.g., a fan, a crossflow blower, a heat sink, DTM system, cooling system, housing, vents, and so forth). System 1000 may also include wireless communications chip 1016 and graphics device 1018, non-volatile memory port (NVMP) 1024, and antenna 1026. The embodiments, however, are not limited to these elements.

As shown in FIG. 10, I/O device 1006, RAM 1008, and ROM 1010 are coupled to processor 1002 by way of chipset 1004. Chipset 1004 may be coupled to processor 1002 by a bus 1012. Accordingly, bus 1012 may include multiple lines.

Processor 1002 may be a central processing unit comprising one or more processor cores and may include any number of processors having any number of processor cores. The processor 1002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1002 may be multiple separate processors located on separate integrated circuit chips. In some embodiments processor 1002 may be a processor having integrated graphics, while in other embodiments processor 1002 may be a graphics core or cores. Commands can be provided to processor 1002, for example, through keyboard, touch screen interaction, gestures, facial expressions, and sounds.

The following examples pertain to further embodiments. In example 1 an apparatus may include a memory to store a recorded video; an interface to receive at least one set of sensor information based on sensor data that is recorded concurrently with the recorded video; and a video clip creation module to identify a sensor event from the at least one set of sensor information and to generate a video clip based upon the sensor event, where the video clip comprises video content from the recorded video that is synchronized to the sensor event.

In example 2, the sensor information of example 1 may include analyzed sensor data calculated from the sensor data.

In example 3, the video clip creation module of any of examples 1 to 2 may be to identify a multiplicity of sensor events from the sensor information and to generate a respective multiplicity of video clips from the recorded video that are synchronized to the respective multiplicity of sensor events.

In example 4, the video clip creation module of any of examples 1 to 3 may be to identify a first time stamp of sensor data associated with the sensor event and generate the video clip according to a second time stamp of the recorded video wherein the first time stamp and second time stamp correspond to a same instance.

In example 5, the sensor information of any of examples 1 to 4 may include a multiplicity of sensor data streams recorded from a multiplicity of sources concurrently with recording of the recorded video.

In example 6, the at least one set of sensor information of any of examples 1 to 5 may include wearable sensor data.

In example 7, the video clip creation module of any of examples 1 to 6 may be to receive the sensor information, and to generate the video clip based upon the sensor event when the sensor information matches a predetermined criterion.

In example 8, the video clip creation module of any of examples 1 to 7 may be to generate the video clip based upon a predetermined relation to a time stamp of the sensor event.

In example 9, the video clip creation module of any of examples 1 to 8 may be to predict an activity based upon the sensor event during recording of the video, and to generate a signal to adjust recording of the recorded video based upon the predicted activity.

In example 10, the video clip creation module of any of examples 1 to 9 may be to activate video clip generation in accordance with a time of day or user activity recorded in the recorded video.

In example 11, the video clip creation module of any of examples 1 to 10 may be automatically direct transmission of a video clip to an external social media site that is publicly accessible.

In example 12, the video clip creation module of any of examples 1 to 11 may be to determine a source of the sensor information and schedule transmission of the video clip to a target destination at a remote location based upon the source of the sensor information.

Example 13 includes at least one machine-readable storage medium comprising instructions that when executed by a computing device, cause the computing device to: store a recorded video; receive at least one set of sensor information based on sensor data that is recorded concurrently with the recorded video; and identify a sensor event from the at least one set of sensor information and to generate a video clip based upon the sensor event, the video clip comprising video content from the recorded video that is synchronized to the sensor event.

In example 14, the at least one machine-readable storage medium of example 13 may include instructions that when executed by a computing device, cause the computing device to identify a multiplicity of sensor events from the sensor information and to generate a respective multiplicity of video clips from the recorded video that are synchronized to the respective multiplicity of sensor events.

In example 15, the at least one machine-readable storage medium of any of examples 13 to 14 may include instructions that when executed by a computing device, cause the computing device to identify a first time stamp of sensor data associated with the sensor event and generate the video clip according to a second time stamp of the recorded video wherein the first time stamp and second time stamp correspond to a same instance.

In example 16, the at least one machine-readable storage medium of any of examples 13 to 15 may include instructions that when executed by a computing device, cause the computing device to receive the sensor information, and to generate the video clip based upon the sensor event when the sensor information matches a predetermined criterion.

In example 17, the at least one machine-readable storage medium of any of examples 13 to 16 may include instructions that when executed by a computing device, cause the computing device to generate the video clip based upon a predetermined relation to a time stamp of the sensor event.

In example 18, the at least one machine-readable storage medium of any of examples 13 to 17 may include instructions that when executed by a computing device, cause the computing device to predict an activity based upon the sensor event during recording of the recorded video, and to generate a signal to adjust recording of the recorded video based upon the predicted activity.

In example 19, the at least one machine-readable storage medium of any of examples 13 to 18 may include instructions that when executed by a computing device, cause the computing device to determine a source of the sensor information and schedule transmission of the video clip to a target destination at a remote location based upon the source of the sensor information.

Example 20 is a computer implemented method that may include storing a recorded video; receiving at least one set of sensor information comprising sensor data that is recorded concurrently with the recorded video; identifying a sensor event from the at least one set of sensor information; and generating a video clip based upon the sensor event, the video clip comprising video content from the recorded video that is synchronized to the sensor event.

In example 21, the computer implemented method of example 20 may include identifying a multiplicity of sensor events from the sensor information and generating a respective multiplicity of video clips from the recorded video that are synchronized to the respective multiplicity of sensor events.

In example 22 the computer implemented method of any of examples 20 to 21 may include identifying a first time stamp of sensor data associated with the sensor event and generating the video clip according to a second time stamp of the recorded video wherein the first time stamp and second time stamp correspond to a same instance.

In example 23, the computer implemented method of any of examples 20 to 22 may include receiving the sensor information, and generating the video clip based upon the sensor event when the sensor information matches a predetermined criterion.

In example 24, the computer implemented method of any of examples 20 to 23 may include predicting an activity based upon the sensor event during recording of the recorded video, and generating a signal to adjust recording of the recorded video based upon the predicted activity.

In example 25, the computer implemented method of any of examples 20 to 24 may include determining a source of the sensor information and scheduling transmission of the video clip to a target destination at a remote location based upon the source of the sensor information.

Example 26 includes user equipment to automatically generate a video clip comprising means to perform the method of any of examples 20-25.

Example 27 includes an apparatus to automatically generate a video clip comprising means to perform the method of any one of examples 20-25.

In example 28, a system for automatically generating a video clip, includes a video recording component to record a video; a memory to store the recorded video; an interface to receive at least one set of sensor information based on sensor data that is recorded concurrently with the recorded video; and a video clip creation module to identify a sensor event from the at least one set of sensor information and to generate a video clip based upon the sensor event, where the video clip comprises video content from the recorded video that is synchronized to the sensor event.

In example 29, video clip creation module of example 28 may be to identify a multiplicity of sensor events from the sensor information and to generate a respective multiplicity of video clips from the recorded video that are synchronized to the respective multiplicity of sensor events.

In example 30, video clip creation module of any of examples 28 to 29 may be to identify a first time stamp of sensor data associated with the sensor event and generate the video clip according to a second time stamp of the recorded video wherein the first time stamp and second time stamp correspond to a same instance.

In example 31, video clip creation module of any of examples 28 to 30 may be to receive the sensor information, and to generate the video clip based upon the sensor event when the sensor information matches a predetermined criterion.

In example 32, video clip creation module of any of examples 28 to 31 may be to generate the video clip based upon a predetermined relation to a time stamp of the sensor event.

In example 33, video clip creation module of any of examples 28 to 32 may be to predict an activity based upon the sensor event during recording of the video, and to generate a signal to adjust recording of the recorded video based upon the predicted activity.

In example 34, video clip creation module of any of examples 28 to 33 may be to activate video clip generation in accordance with a time of day or user activity recorded in the recorded video.

In example 35, video clip creation module of any of examples 28 to 34 may be to automatically direct transmission of a video clip to an external social media host that is publicly accessible.

In example 36, video clip creation module of any of examples 28 to 35 may be to determine a source of the sensor information and schedule transmission of the video clip to a target destination at a remote location based upon the source of the sensor information.

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:
1. An apparatus, comprising:
  a memory to store a recorded video;
  an interface to receive sensor information based on sensor data recorded by a plurality of sensors concurrently with the recorded video, the plurality of sensors comprising a first portion of sensors and a second portion of sensors; and
  a video clip creation module to:
    identify a sensor event based on the sensor information,
    predict an activity based upon the sensor event during recording of the video, and to generate a signal to adjust recording of the recorded video based upon the predicted activity;
    determine whether the sensor information was received from the first portion of sensors or the second portion of sensors,
    generate a video clip based upon the sensor event responsive to the sensor information being received from the first portion of sensors, the video clip comprising video content from the recorded video that is synchronized to the sensor event, and prevent a generation of the video clip for the sensor event responsive to the sensor information being received from the second portion of sensors.

2. The apparatus of claim 1, the video clip creation module to identify a first time stamp of sensor data associated with the sensor event and generate the video clip according to a second time stamp of the recorded video wherein the first time stamp and second time stamp correspond to a same instance.

3. The apparatus of claim 1, the sensor information comprising a multiplicity of sensor data streams recorded from a multiplicity of sources concurrently with recording of the recorded video.

4. The apparatus of claim 1, the sensor information comprising wearable sensor data.

5. The apparatus of claim 1, the video clip creation module to receive the sensor information, and to generate the video clip based upon the sensor event when the sensor information matches a predetermined criterion.

6. The apparatus of claim 1, the video clip creation module to generate the video clip based upon a predetermined relation to a time stamp of the sensor event.

7. The apparatus of claim 1, the video clip creation module to activate video clip generation in accordance with a time of day or activity recorded in the recorded video.

8. At least one machine-readable storage medium comprising instructions that when executed by a computing device, cause the computing device to:
store a recorded video;
receive sensor information based on sensor data recorded by a plurality of sensors concurrently with the recorded video, the plurality of sensors comprising a first portion of sensors and a second portion of sensors;
identify a sensor event based on the sensor information;
predict an activity based upon the sensor event during recording of the video, and to generate a signal to adjust recording of the recorded video based upon the predicted activity
determine whether the sensor information was received from the first portion of sensors or the second portion of sensors;
generate a video clip based upon the sensor event responsive to the sensor information being received from the first portion of sensors, the video clip comprising video content from the recorded video that is synchronized to the sensor event; and
prevent a generation of the video clip for the sensor event responsive to the sensor information being received from the second portion of sensors.

9. The at least one machine-readable storage medium of claim 8 comprising instructions that when executed by a computing device, cause the computing device to identify a multiplicity of sensor events from the sensor information and to generate a respective multiplicity of video clips from the recorded video that are synchronized to the respective multiplicity of sensor events.

10. The at least one machine-readable storage medium of claim 8 comprising instructions that when executed by a computing device, cause the computing device to identify a first time stamp of sensor data associated with the sensor event and generate the video clip according to a second time stamp of the recorded video wherein the first time stamp and second time stamp correspond to a same instance.

11. The at least one machine-readable storage medium of claim 8 comprising instructions that when executed by a computing device, cause the computing device to receive the sensor information, and to generate the video clip based upon the sensor event when the sensor information matches a predetermined criterion.

12. The at least one machine-readable storage medium of claim 8 comprising instructions that when executed by a computing device, cause the computing device to generate the video clip based upon a predetermined relation to a time stamp of the sensor event.

13. A computer implemented method, comprising:
storing a recorded video;
receiving sensor information comprising sensor data recorded by a plurality of sensors concurrently with the recorded video, the plurality of sensors associated with a first entity or object and a second entity or object;
identifying a sensor event based on the sensor information;
predict an activity based upon the sensor event during recording of the video, and to generate a signal to adjust recording of the recorded video based upon the predicted activity;
determining whether the sensor event was triggered by the first entity or object or the second entity or object;
generating a video clip based upon the sensor event responsive to the sensor event being triggered by the first entity or object, the video clip comprising video content from the recorded video that is synchronized to the sensor event; and
preventing a generation of the video clip for the sensor event responsive to the sensor event being triggered by the second entity or object.

14. The computer implemented method of claim 13, comprising identifying a multiplicity of sensor events from the sensor information and generating a respective multiplicity of video clips from the recorded video that are synchronized to the respective multiplicity of sensor events.

15. The computer implemented method of claim 13, comprising identifying a first time stamp of sensor data associated with the sensor event and generating the video clip according to a second time stamp of the recorded video wherein the first time stamp and second time stamp correspond to a same instance.

16. The computer implemented method of claim 13, comprising receiving the sensor information, and generating the video clip based upon the sensor event when the sensor information matches a predetermined criterion.

17. The apparatus of claim 1, the first portion of sensors being associated with at least one first entity and the second portion of sensors being associated with at least one second entity.

18. The apparatus of claim 17, the at least one first entity comprising at least one player.

19. The at least one machine-readable storage medium of claim 8, the first portion of sensors being associated with at least one first entity and the second portion of sensors being associated with at least one second entity.

20. The at least one machine-readable storage medium of claim 19, the at least one first entity comprising at least one player.

21. The computer implemented method of claim 13, the at least one first entity or object comprising at least one player.

* * * * *